US006629233B1

(12) United States Patent
Kahle

(10) Patent No.: US 6,629,233 B1
(45) Date of Patent: Sep. 30, 2003

(54) SECONDARY REORDER BUFFER MICROPROCESSOR

(75) Inventor: James Allan Kahle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/506,527

(22) Filed: Feb. 17, 2000

(51) Int. Cl.$^{7}$ .................................................. G06F 9/30
(52) U.S. Cl. ....................................... 712/218; 712/217
(58) Field of Search ................................ 712/218, 216, 712/215, 217

(56) References Cited

U.S. PATENT DOCUMENTS 5,727,177 A 3/1998 McMinn et al.

OTHER PUBLICATIONS

Doug Hunt; "Advanced Performance Features of the 64–bit PA–8000"; Digest of Papers of the Computer Society Computer Conference (Spring); Compcon, US, Los Alamitos, IEEE Comp. Soc. Press; vol. Conf. 40, Mar. 5, 1995, pp. 123–128,XP000545421.

*Primary Examiner*—Eddie Chan
*Assistant Examiner*—Charles Harkness
(74) *Attorney, Agent, or Firm*—Joseph P. Lally; Diana L. Roberts; Volel Emile

(57) ABSTRACT

A method, processor, and data processing system for enabling maximum instruction issue despite the presence of complex instructions that require multiple rename registers is disclosed. The method includes allocating a first rename register from a first reorder buffer for storing the contents of a first register affected by the complex instruction. A second rename register from a second reorder buffer is then allocated for storing the contents of a second register affected by the complex instruction. In an embodiment in which the first reorder buffer supports a maximum number of allocations per cycle, the allocation of the second register using the second reorder buffer prevents the complex instruction from requiring multiple allocation slots in the first reorder buffer. The method may further include issuing a second instruction that contains a dependency on a register that is allocated in the secondary reorder buffer. In one embodiment, reorder buffer information indicating the second instruction's dependence on a register allocated in the secondary reorder buffer is associated with the second instruction such that, when the second instruction is issued subsequently, the reorder buffer information is used to restrict the issue unit to checking only the secondary reorder buffer for dependencies.

16 Claims, 4 Drawing Sheets

SECONDARY REORDER BUFFER MICROPROCESSOR

BACKGROUND

1. Field of the Present Invention

The present invention generally relates to the field of microprocessors and more particularly to a microprocessor utilizing a secondary reorder buffer for instructions with multiple targets.

2. History of Related Art

The use of reorder buffers in microprocessors to enable out-of-order execution is well known. See, e.g., Hennessy & Patterson, *Computer Architecture a Quantitative Approach,* pp. 309–317 (Morgan Kaufmann 2d ed. 1996). Reorder buffers are used to store results of executed instructions until an instruction is finally committed. Many superscalar processors allow multiple instructions to issue in a single cycle. To achieve maximum performance, rename register allocation for each issued instruction should occur in the cycle in which the instruction is issued. Typically, each issued instruction affects the contents of a single register in the microprocessor and therefore requires just a single rename register entry. In other cases, however, an instruction (referred to herein as a complex instruction) affects the contents of two or more registers. Register renaming for these complex instructions should also occur in the issue cycle if optimum performance is to be achieved. Unfortunately, the renaming buffers employed in conventional microprocessors are limited in the number of allocations they can perform in a single cycle. This limitation on the number of rename allocations that can occur in a single cycle coupled with the existence of instructions requiring multiple allocations complicates the issue unit and can result in the issue unit being unable to issue the maximum number of instructions in a particular cycle if one of the instructions is a complex instruction. Therefore it would be desirable to implement a microprocessor capable of issuing the maximum number of instructions per cycle regardless of whether the instructions include simple instructions, complex instructions, or a combination of both.

SUMMARY OF THE INVENTION

The problem identified above is in large part addressed by a method, processor, and data processing system for enabling maximum instruction issue per cycle despite the presence of complex instructions that require multiple rename registers. The method includes allocating a first rename register in a first reorder buffer for storing the contents of a first register affected by the complex instruction. A second rename register in a second reorder buffer is then allocated for storing the contents of a second register affected by the complex instruction. In an embodiment in which the first reorder buffer supports a maximum number of allocations per cycle, the allocation of the second register using the second reorder buffer prevents the complex instruction from requiring multiple allocation slots in the first reorder buffer. The method may further include issuing a second instruction that contains a dependency on a register that is allocated in the secondary reorder buffer. In one embodiment, reorder buffer information indicating the second instruction's dependence on a register allocated in the secondary reorder buffer is associated with the second instruction such that, when the second instruction is issued subsequently, the reorder buffer information is used to restrict the issue unit to checking only the secondary reorder buffer for dependencies.

BRIEF DESCRIPTION OF THE DRAWINGS

Other objects and advantages of the invention will become apparent upon reading the following detailed description and upon reference to the accompanying drawings in which.

Figure 1:
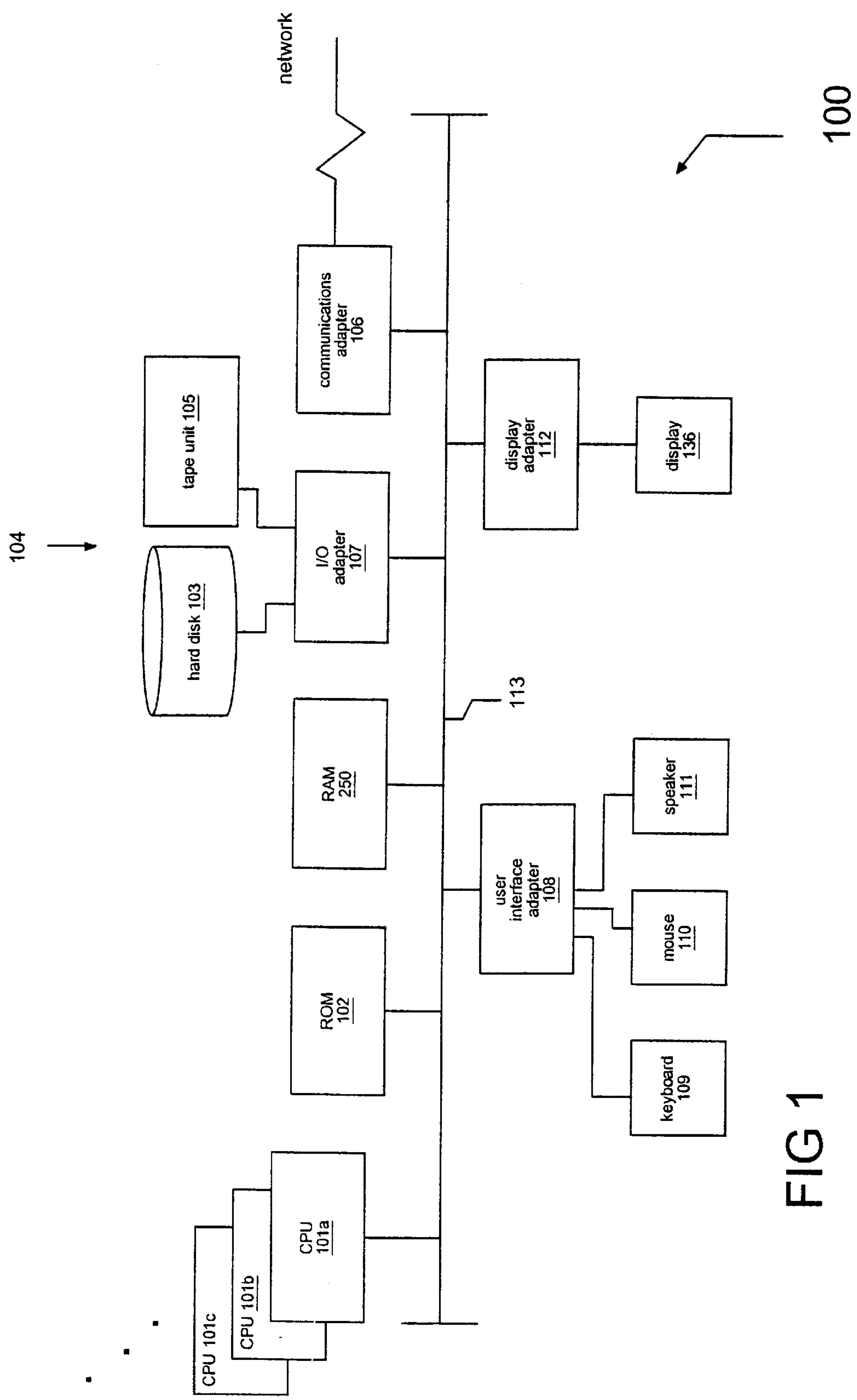
FIG. 1 is a block diagram of a data processing system.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF A PREFERRED EMBODIMENT OF THE PRESENT INVENTION

Referring now to FIG. 1, an embodiment of a data processing system 100 according to the present invention is depicted. System 100 has one or more central processing units (processors) 101*a,* 101*b,* 101*c,* etc. (collectively or generically referred to as processor(s) 101. In one embodiment, each processor 101 may comprise a reduced instruction set computer (RISC) microprocessor. Additional information concerning RISC processors in general is available in C. May et al. Ed., *PowerPC Architecture: A Specification for a New Family of RISC Processors,* (Morgan Kaufmann, 1994 2d edition). Processors 101 are coupled to system memory 250 and various other components via system bus 113. Read only memory (ROM) 102 is coupled to the system bus 113 and may include a basic input/output system (BIOS), which controls certain basic functions of system 100. FIG. 1 further depicts an I/O adapter 107 and a network adapter 106 coupled to the system bus 113. I/O adapter 107 may be a small computer system interface (SCSI) adapter that communicates with a hard disk 103 and/or tape storage drive 105. I/O adapter 107, hard disk 103, and tape storage device 105 are collectively referred to herein as mass storage 104. A network adapter 106 interconnects bus 113 with an outside network enabling data processing system 100 to communicate with other such systems. Display monitor 136 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O busses for connecting peripheral devices such as hard disk controllers, network adapters, and graphics adapters include the Peripheral Components Interface (PCI) bus according to PCI Local Bus Specification Rev. 2.2 available from the PCI Special Interest Group, Hillsboro Oreg., and incorporated by reference herein. Additional input/output devices are shown as connected to system bus 113 via user interface adapter 108 and display adapter 112. A keyboard 109, mouse 110, and speaker 111 all interconnected to bus 113 via user interface adapter 108, which may include, for example, a SuperI/O chip integrating multiple device adapters into a single integrated circuit. For additional information concerning one such chip, the reader is referred to the PC87338/PC97338 ACPI 1.0 and PC98/99 Compliant SuperI/O data sheet from National Semiconductor Corporation (November 1998) at www.national.com. Thus, as configured in FIG. 1, system 100 includes processing means in the form of processors 101, storage means including system memory 250 and mass storage 104, input means such as keyboard 109 and mouse 110, and output means including speaker 111 and display 136. In one embodiment a portion of system memory 250 and mass storage 104 collectively store an operating system, such as the AIX® operating system from IBM Corporation, to coordinate the functions of the various components shown in FIG. 1. Additional detail concerning the AIX operating system is available in *AIX Version* 4.3 *Technical Reference: Base Operating System and Extensions, Volumes* 1 *and* 2 (order numbers SC23-4159 and SC23-4160); *AIX Version* 4.3 *System User's Guide: Communications and Networks* (order number SC23-4122); and *AIX Version* 4.3 *System User's Guide: Operating System and Devices* (order number SC23-4121) from IBM Corporation at www.ibm.com and incorporated by reference herein.

Figure 2:
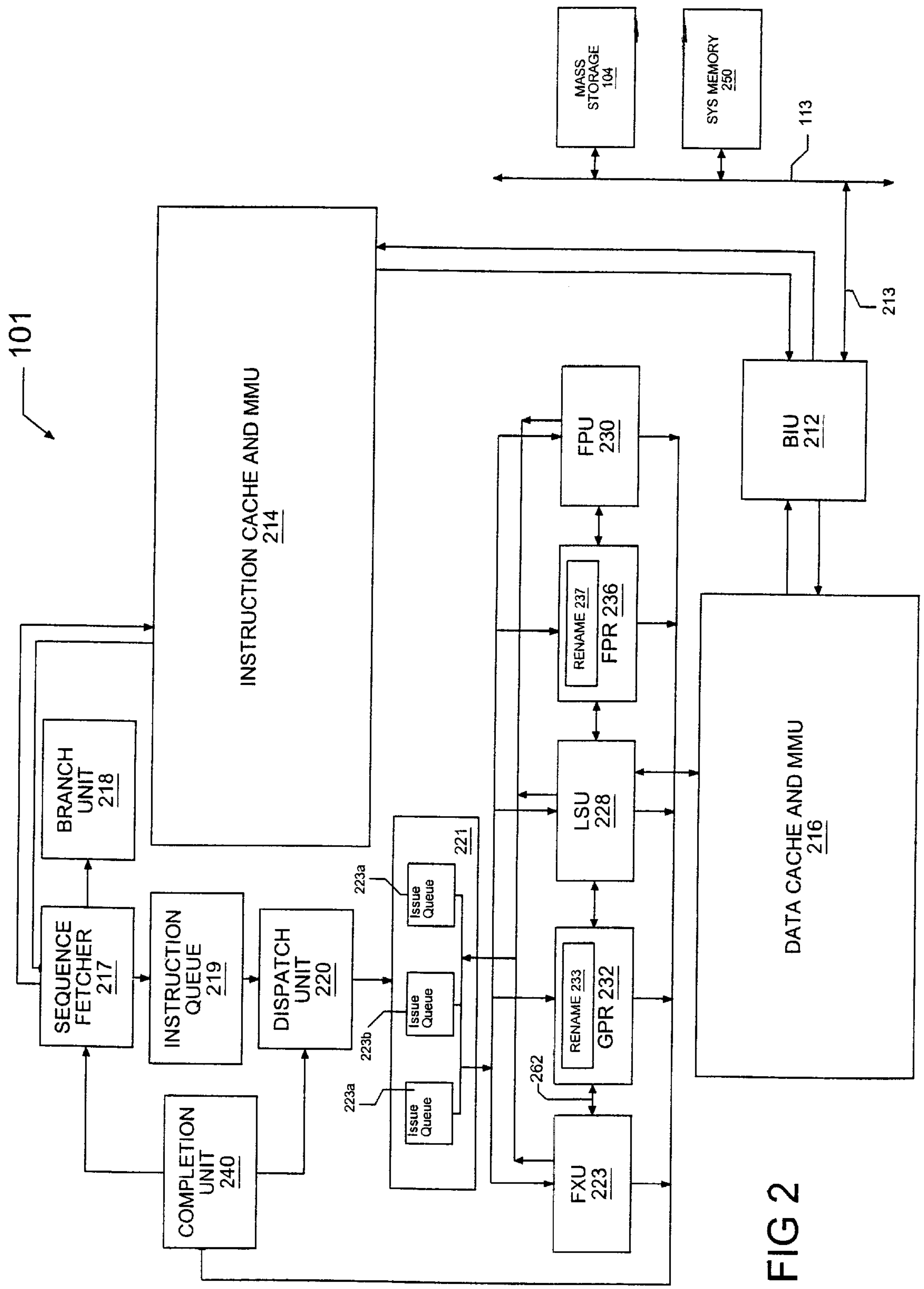
FIG. 2 is a block diagram of a processor for suitable for use in the data processing system of FIG. 1.

Turning now to FIG. 2, a simplified block diagram of an embodiment of processor 101 suitable for use in system 100 is presented. In the depicted embodiment, processor 101 comprises an integrated circuit superscalar microprocessor fabricated on a monolithic semiconductor substrate. Processor 101 includes various execution units, registers, buffers, memories, and other functional units as discussed in greater detail below. As illustrated in FIG. 2, processor 101 is coupled to system bus 113 via bus interface unit (BIU) 212 and processor bus 213, which like system bus 113 includes address, data, and control buses. BIU 212 controls the transfer of information between processor 101 and other devices coupled to system bus 113, such as system memory 250 and mass storage 104. It will be appreciated that processor 101 may include other devices coupled to system bus 113 that are not necessary for an understanding of the following description and are accordingly omitted for the sake of simplicity.

BIU 212 is connected to instruction cache and memory management unit 214 and data cache and memory management unit 216 within processor 101. High-speed caches, such as those within instruction cache 214 and data cache 216, enable processor 101 to achieve relatively fast access times to a subset of data or instructions previously transferred from system memory 250, thus improving the speed of operation of data processing system 100. Data and instructions stored within data cache 216 and instruction cache 214, respectively, are identified and accessed by address tags, which each comprise a selected number of bits (typically the high-order bits) of the system memory physical address in which the data or instructions reside. Sequential fetch unit 217 retrieves instructions for execution from instruction cache 214 during each clock cycle. In one embodiment, if sequential fetch unit 217 retrieves a branch instruction from instruction cache 214 the branch instruction is forwarded to branch processing unit (BPU) 218 for execution. Sequential fetch unit 217 forwards non-branch instructions to an instruction queue 219, where the instructions are stored temporarily pending execution by other functional units of processor 101. A dispatch unit 220 is responsible for retrieving stored instructions from queue 219 and forwarding the instructions to an issue unit (ISU) 221. Dispatch unit 220 schedules dispatch of instructions to issue unit 221 based, in part, on instruction completion information received from a completion unit 240. The depicted embodiment of ISU 221 includes one or more issue queues 222*a*, 222*b*, 222*c*, etc. (collectively or generically referred to issues queue(s) 222). ISU 221 is responsible for maintaining fully loaded pipelines by issuing new instructions in each cycle to the execution units whenever possible. In one embodiment, instructions are issued from ISU 221 out-of-order.

In the depicted embodiment, the execution circuitry of processor 101, in addition to BPU 218, includes multiple functional units for executing sequential instructions, including fixed-point-unit (FXU) 223, load/store unit (LSU) 228, and floating-point unit (FPU) 230. Each of execution units 223, 228 and 230 typically executes one or more instructions of a particular type during each processor cycle in a pipelined fashion. For example, FXU 223 performs fixed-point mathematical and logical operations such as addition, subtraction, ANDing, ORing, and XORing, utilizing source operands received from specified general purpose registers (GPRs) 232. Following the execution of a fixed-point instruction, FXU 223 outputs the data results of the instruction to GPR buffers 232, which provide storage for the result received on result bus 262. The FPU 230 typically performs single and double-precision floating-point arithmetic and logical operations, such as floating-point multiplication and division, on source operands received from floating-point registers (FPRs) 236. FPU 230 outputs data resulting from the execution of floating-point instructions to selected FPR buffers 236, which store the result data. As its name implies, LSU 228 typically executes floating-point and fixed-point load instructions, which load data from data cache 216, a lower level cache memory (not depicted), or system memory 250 into selected GPRs 232 or FPRs 236 or and floating-point and fixed-point store instructions, which store data from a selected one of GPRs 232 or FPRs 236 to data cache 216 and, ultimately, to system memory 250.

In the preferred embodiment, processor 101 employs out-of-order instruction execution to further improve the performance of its superscalar architecture. Accordingly, instructions can be executed by FXU 223, LSU 228, and FPU 230 in an order that varies from the original program order of the instructions as long as data dependencies are observed. As indicated previously, instructions are processed by each of FXU 223, LSU 228, and FPU 230 as a sequence of pipeline stages. In one embodiment, processor 101 includes five distinct pipeline stages, namely, fetch, decode/dispatch, execute, finish, and completion.

During the fetch stage, sequential fetch unit 217 retrieves one or more non-branch instructions from instruction cache 214 and stores the fetched instructions within instruction queue 219. In contrast, sequential fetch unit 217 forwards any branch instructions from the instruction stream to BPU 218 for execution. BPU 218 includes a branch prediction mechanism that includes, in one embodiment, a dynamic prediction mechanism such as a branch history table that enables BPU 218 to speculatively execute unresolved conditional branch instructions by predicting whether or not the branch will be taken.

During the decode/dispatch stage, dispatch unit 220 and ISU 221 decode and issue one or more instructions from issue queues 222 to execution units 223, 228, and 230, typically in program order. ISU 221 may allocate one or more rename buffers within GPR rename buffers 233 or FPR rename buffers 237 for temporarily storing the result (or results) of an instruction prior to committing the result or results to GPRs 232 and FPRs 237. In addition, instructions (or instructions identifiers or tags representative of the instructions) may be stored within the multiple-slot completion buffer (the completion table) of completion unit 240 as a means of tracking which instructions have completed.

During the execute stage, execution units 223, 228, and 230 execute instructions issued from ISU 220 opportunistically as operands and execution resources for the indicated operations become available. In one embodiment, each of execution units 223, 228, and 230 are equipped with a reservation station that stores instructions dispatched to that execution unit until operands or execution resources become available. After execution of an instruction has terminated, execution units 223, 228, and 230 store data results, if any, within either GPRs or FPRs, depending upon the instruction type. In the depicted embodiment, execution units 223, 228, and 230 notify completion unit 240 which instructions have finished execution. Finally, instructions are completed in program order out of the completion table of completion unit 240. Instructions executed by FXU 223 and FPU 230 are completed by transferring data results of the instructions from GPR rename buffers 233 and FPR rename buffers 237 to GPRs 232 and FPRs 236, respectively.

Processor 101 preferably supports out-of-order speculative instruction execution. Instructions may be speculative on a predicted branch direction or speculative beyond an instruction that may cause an interrupt condition. In the event of a branch misprediction or an interrupt, hardware automatically flushes undesired instructions from the pipelines and discards undesired results, presenting the effect of precise exceptions and sequentially executed instructions down the appropriate branch paths. Incorrect speculative results are selectively flushed from all units in one clock cycle, and instruction issue can resume the following clock cycle. Processor 101 may include multiple load units and a single store unit. However, it should be clear to one skilled in the art that processor 101 could comprise other configurations such as a single load/store unit, etc.

When an instruction is issued, the ISU 221 tags the instruction in such a manner that relative age between any two instructions can be easily determined. In one embodiment, sequential instructions are tagged with integer values (ITAGs). In addition to providing a mechanism for determining the issue order and relative age of issued instructions, ITAGs provide a shorthand representation of their corresponding instructions. The ITAG value of each instruction is associated with queue entries and pipeline stages in which it resides. The use of ITAGs facilitates an instruction flush mechanism (in response to a processor-generated flush instruction) in which a magnitude comparison between the ITAG associated with the flush instruction and the ITAG associated with a particular queue entry or functional unit stage is performed and the entry invalidated if it is for an instruction which is as young or younger than (i.e., issued simultaneously or after) the flushed instruction. All remnants of the flushed instruction (and all subsequent instructions) are "flushed" from the machine and the fetch unit is redirected to the fetch starting at the address of the "flushed" instruction.

One embodiment of the present invention contemplates a method of handling instruction issue and register renaming for instructions requiring multiple rename entries. In many instruction sets, such as the PowerPC® instruction set, the majority of instructions update the contents of just a single register. (Detailed information regarding the PowerPC® instruction set is available in the *PowerPC* 620 *RISC Microprocessor User's Manual* available from Motorola, Inc. (Order No. MPC620UM/AD), which is incorporated by reference herein). Such instructions, therefore, require only a single rename register entry to store the instruction's result temporarily until the result is committed to GPR 232. In superscalar machines employing multiple, parallel execution units and enabled to issue multiple instructions per cycle, the one-to-one correspondence between an instruction and the rename register allocated for its result simplifies the issue and rename allocation process. If a processor is capable of issuing four instructions per cycle, for example, register rename control logic is designed to allocate up to four rename registers per cycle. The issue/rename mechanism becomes more complicated, however, if the instruction set also includes one or more instructions that require the allocation of multiple rename registers. In the PowerPC® instruction set, for example, some instructions affect the contents of two registers (the result registers). For purposes of this disclosure, instructions affecting the contents of multiple registers are referred to as complex instructions. If the processor is to fully support out-of-order execution, each of the result registers must be allocated a rename register in the cycle when a complex instruction is issued. Conventionally, the multiple rename registers required for complex instructions prevented other instructions from issuing in the cycle when the complex instruction issued. The issue logic was required to determine whether the total number of rename registers required to be allocated during a given cycle exceeded a specified maximum. If, for example, a processor was capable of issuing four "simple" instructions (i.e., instructions that affect the contents of just a single register) per cycle (and allocating four rename registers in that cycle) and the processor's issue unit issued a complex instruction, the issue unit would be required to prevent the other three issue slots from all issuing instruction in the same cycle. In other words, the processor would have to prevent one of the three remaining issue slots from issuing an instruction and would further have to ensure that the two remaining issue slots did not issue complex instructions themselves. Thus, the presence of complex instructions in a multiple issue superscalar microprocessor increased the complexity of the issue logic and negatively affected performance by preventing the maximum number of instructions from issuing in a single cycle.

Figure 3:
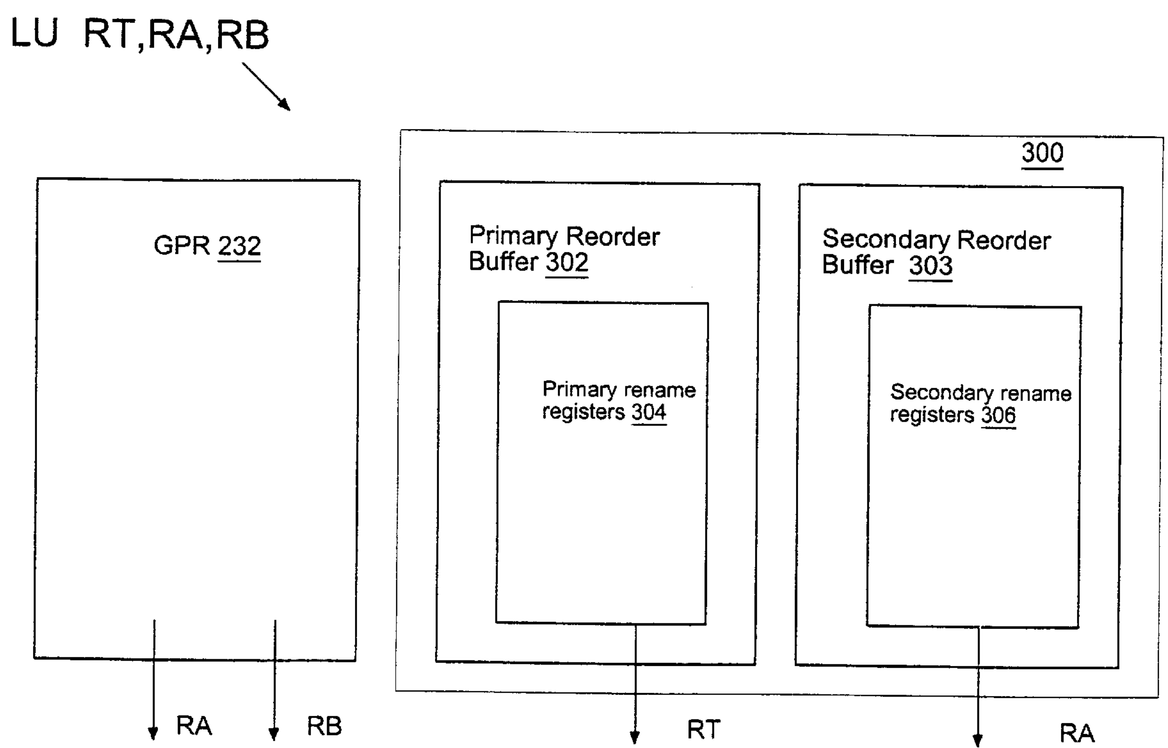
FIG. 3 is a block diagram of a reorder buffer including a primary reorder buffer and a secondary reorder buffer according to one embodiment of the present invention.

Turning now to FIG. 3, a reorder buffer 300 according to one embodiment of the present invention is depicted. Reorder buffer 300 according to the present invention includes a primary reorder buffer 302 and a secondary reorder buffer 303. The primary reorder buffer 302 contains primary rename GPRs 304 while the secondary reorder buffer 303 contains secondary rename GPRs 306. The combination of primary rename GPRs 302 and secondary rename GPRs 304 comprise the rename GPRs indicated by reference numeral 233 in FIG. 2. (Although the depicted embodiment of reorder buffer 300 is specific to rename GPRs 233, reorder buffer 300 may include rename FPRs 237 instead or in addition to the rename GPRs 233). In the preferred embodiment, all rename registers for simple instructions are allocated in primary reorder buffer 302. In addition, the primary reorder buffer 302 is also used to allocate a primary rename register 304 for a primary register associated with each complex instruction. The secondary reorder buffer 303, on the other hand, is not used when a simple instruction is issued but is used to allocate a secondary rename register 306 for a secondary register of a complex instruction. If, as an example using the PowerPC instruction set, a simple load instruction LOAD RT, RA, RB is issued, a rename register 304 is allocated when the instruction issues to hold the result of the instruction until the instruction is ultimately committed (i.e., when the result is written to the target register RT in GPR (register file) 232). Because the load instruction in this example affects the contents of just a single register, only a single rename register is required to be allocated. In a second example, a complex instruction such as Load with Update (LU) instruction is issued (e.g., LU RT, RA, RB). The load with update instruction calculates an effective address based on the contents of registers RA and RB and loads the target register RT with the contents of the memory location with the calculated effective address. In addition, the instruction updates the contents of RA with the value of the calculated effective address. The LU instruction is useful in a variety of circumstances including the implementation of software loops by providing a single instruction that automatically increments the source memory address each time the instruction is executed. The LU instruction is a complex instruction because it affects the contents of two registers and therefore requires two rename registers to be allocated when issued. In the depicted embodiment, the operand information in registers A and B is read from a dual ported register file 232. In this example, however, a primary rename register 304 in primary reorder buffer 302 is allocated for the target register RT while a secondary rename register 306 is allocated in secondary reorder buffer 303 for the secondary register (RA) value. In comparison, a conventionally designed processor would be forced to allocate registers for both the RT and RA registers in the (single) reorder buffer when the instruction issues. Because the processor is only able to allocate a specified number of registers per cycle, and because the LU instruction consumes two of these allocation slots, the conventional processor would undesirably be forced to issue fewer than the maximum allowable number of instructions during the cycle in which the LU instruction issued. Although the example uses an LU instruction, those familiar with the PowerPC instruction set and other instruction sets that contain one or more complex instructions will appreciate that any instruction affecting the contents of two registers would benefit from the inclusion of a secondary reorder buffer as disclosed herein.

The incorporation of an additional resource in the form of secondary reorder buffer 303 for register renaming beneficially enables processor 101 to issue the maximum allowable number of instructions in each cycle (assuming the maximum number of instructions are ready to issue), without regard to whether the instructions are simple, complex, or a combination thereof. In the absence of the resource provided by secondary reorder buffer 303, the issue of a complex instruction would require allocation of multiple rename registers in the processor's (single) reorder buffer. Because the number of rename registers that a single reorder buffer can allocate in a single cycle is architecturally limited, the complex instruction would prevent the processor from issuing the maximum number of instructions in the cycle in which a complex instruction is issued. Moreover, the intelligence necessary to determine what number of instructions, in the presence of complex instructions, is permitted to issue in any given cycle significantly increases the complexity required of the issue logic.

Figure 4:
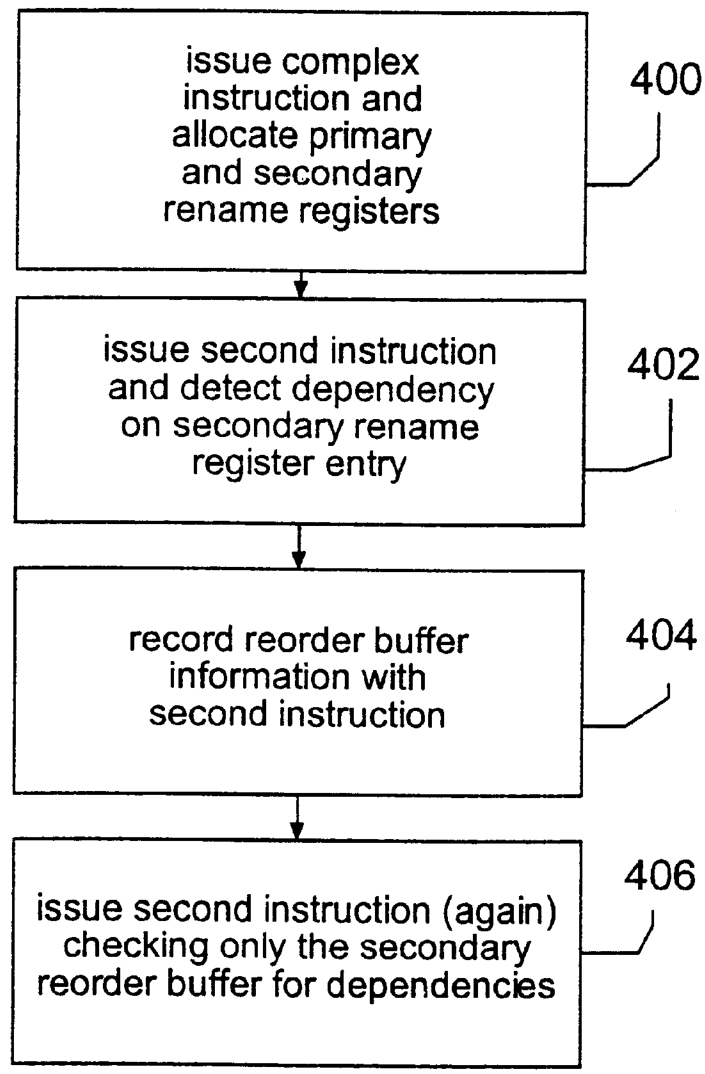
FIG. 4 is a flow diagram illustrating the operation of one embodiment of the invention.

The presence of secondary reorder buffer 303 necessitates a mechanism by which instructions determine whether any of their operand registers are currently allocated in the secondary reorder buffer 303. In one embodiment, processor 101 may simply require each instruction that is issued while a complex instruction is in-flight to search both reorder buffers to determine any dependencies. While this embodiment enjoys the advantage of simplicity, it undesirably increases the number of reorder buffer entries that must be searched during the issue cycle. As the number of instructions that can issue in any given cycle increases, it becomes increasingly desirable to minimize the number of reorder buffer entries that must be examined to determine instruction dependencies. To address this problem, one embodiment of the invention contemplates a mechanism by which reorder buffer information is recorded during the first execution of an instruction. The reorder buffer information is then used during subsequent executions of the instruction to determine which of the reorders buffers the instruction must examine. Turning to FIG. 4, a flow diagram illustrative of this embodiment is described with respect to the following code segment example:

LQ R4, R25, R26

ADD R7, R5, R2

Block 400 represents issuing the LQ (load quad) instruction. The LQ instruction is a complex instruction in the PowerPC® instruction set that affects the contents of the indicated target register (R4) as well as the next sequential register (R5). Because the ADD instruction includes an R5 source operand, the ADD instruction is dependent upon the LQ instruction. During a first execution of this code segment, the issue unit will force all instructions following the LQ instruction (i.e., all instructions that are issued after the LQ instruction is issued but before the LQ instruction is committed) to search both reorder buffers to detect any dependencies. Thus, in block 402, the issue unit detects the ADD instruction's dependency on R5, which is allocated in a secondary rename register 306 of the secondary reorder buffer 303. Upon detecting a dependency in secondary buffer between the ADD instruction and the LQ instruction, issue unit 221 is configured to record (block 404), reorder buffer information that indicates that the ADD instruction's dependency was found in secondary reorder buffer 303. In one embodiment, this reorder buffer information may be stored in a dedicated bit or set of bits in the instruction cache entry containing the ADD instruction. When the ADD instruction is subsequently executed (block 406), the reorder buffer information corresponding to the ADD instruction informs issue unit 221 that the ADD instruction's dependency is found in the secondary reorder buffer (as it was during the first execution). In this manner, issue unit 221 can advantageously restrict its search of reorder buffer 300 to secondary reorder buffer 303. Although the example is described with respect to a LQ instruction, the mechanism is used in conjunction with other complex instructions such as the PowerPC® LU instruction. Thus, by incorporating a secondary issue buffer in conjunction with the a mechanism for selectively enabling and disabling the secondary reorder buffer, the present invention beneficially provides means for enabling maximum instruction issue per cycle while minimizing the performance penalty on the issue unit.

It will be apparent to those skilled in the art having the benefit of this disclosure that the present invention contemplates simplified and improved performance of the issue/rename mechanism in a microprocessor performance by implementing an additional rename facility to allocate secondary registers in a secondary rename scheme. It is understood that the form of the invention shown and described in the detailed description and the drawings are to be taken merely as presently preferred examples. It is intended that the following claims be interpreted broadly to embrace all the variations of the preferred embodiments disclosed.

What is claimed is:

1. A method of executing instructions in a microprocessor, comprising:

prior to issuing a complex instruction affecting the contents of a first target register and a second target register:

allocating a first rename register associated with the first target register in a first reorder buffer;

allocating a second rename register associated with the second target register in a second reorder buffer;

prior to issuing a simple instruction affecting the contents of a single target register, allocating a single rename register associated with the single target register in the first reorder buffer;

wherein complex and simple instructions consume just one rename register in the first reorder buffer whereby determining rename register availability is achieved by determining the availability of a rename register in the first reorder buffer.

2. The method of claim 1, wherein the first reorder buffer supports a maximum number of allocations per cycle and wherein the issuing of the complex instruction comprises issuing a set of instructions including the complex instruction in a single cycle, wherein the number of instructions in the set of instructions equals the maximum number of allocations per cycle supported by the first reorder buffer.

3. The method of claim 2, wherein the set of instructions may comprise any combination of complex instructions and simple instructions that affect the contents of a single register.

4. The method of claim 1, further comprising, subsequent to issuing the complex instruction, issuing a second instruction, wherein the second instruction is dependent upon the second rename register and, responsive thereto, associating reorder buffer information with the second instruction, wherein the reorder buffer information is indicative of the second instruction's dependence on a register allocated in the secondary buffer.

5. The method of claim 4, further comprising, upon issuing the second instruction after recording the reorder buffer information, using the reorder buffer information to restrict the second instruction's reorder lookup to the secondary reorder buffer.

6. A processor comprising:

an issue unit configured to receive instructions from an instruction cache and adapted to issue instructions for execution;

a first reorder buffer dedicated for allocating rename registers for a primary register of a complex instruction and for allocating a rename register for a sole target register of a single instruction; and a second reorder buffer dedicated for allocating rename registers for a secondary register of the complex instruction;

wherein the issue unit is configured to determine rename register availability for complex and simple instructions by determining the availability of a rename register in the first reorder buffer.

7. The processor of claim 6, wherein the issue unit is further configured to check the first and second reorder buffers upon issuing a second instruction to determine whether the second instruction is dependent on the first instruction.

8. The processor of claim 7, wherein, upon detecting that the second instruction is dependent upon a rename register allocated in the second reorder buffer, the issue unit records reorder buffer information in an instruction cache entry corresponding to the second instruction, wherein the reorder buffer information is indicative of the second instruction's dependence on an entry in the second reorder buffer.

9. The processor of claim 8, wherein the issue unit is configured, upon subsequently issuing the second instruction after recording the reorder buffer information and responsive to the reorder buffer information, to check only the secondary reorder buffer for dependencies.

10. A method of operating a microprocessor having an issue queue capable of allocating a maximum number of rename registers in a primary reorder buffer per cycle, comprising:

issuing a number of instructions equal to the maximum number in a first cycle, wherein at least one of the issued instructions comprises a complex instruction affecting the contents of a primary register and a secondary register;

allocating a first rename register in the primary reorder buffer to the primary register of the complex instruction; and allocating a second rename register in a second reorder buffer of the microprocessor to the secondary register thereby preserving primary reorder buffer slots such that the maximum number of instructions the processor can issue is independent of whether the instructions include a complex instruction.

11. The method of claim 10, further comprising, subsequent to issuing the complex instruction, issuing a second instruction, wherein the second instruction has a dependency on the secondary register and, responsive thereto, associating reorder buffer information with the second instruction, wherein the reorder buffer information is indicative of the second instruction's dependence on a register allocated in the second buffer.

12. The method of claim 11, further comprising using the reorder buffer information when the second instruction is subsequently issued to prevent the issue unit from checking the primary buffer for dependencies.

13. A data processing system comprising a processor, system memory, input means, and display, wherein the processor comprises:

an issue unit configured to receive instructions from an instruction cache and adapted to issue instructions for execution;

a first reorder buffer dedicated for allocating rename registers for a primary register of a complex instruction and for allocating a rename register for a sole target register of a single instruction; and a second reorder buffer dedicated for allocating rename registers for a secondary register of the complex instruction;

wherein the issue unit is configured to determine rename register availability for complex and simple instructions by determining the availability of a rename register in the first reorder buffer.

14. The data processor of claim 13, wherein the issue unit is further configured to check the first and second reorder buffers upon issuing a second instruction to determine whether the second instruction is dependent on the first instruction.

15. The processor of claim 14, wherein, upon detecting that the second instruction has a dependency on a register allocated in the second reorder buffer, the issue unit records reorder buffer information in an instruction cache entry corresponding to the second instruction, wherein the reorder buffer information is indicative of the second instruction's dependency on an entry in the secondary reorder buffer.

16. The processor of claim 15, wherein the issue unit is configured, upon issuing the second instruction after recording the reorder buffer information and responsive to the reorder buffer information, to check only the second reorder buffer for dependencies.

* * * * *